Jan. 10, 1928.
A. FEYZES
1,655,897
APPARATUS FOR BUILDING TIRES
Filed May 22, 1926 2 Sheets-Sheet 1
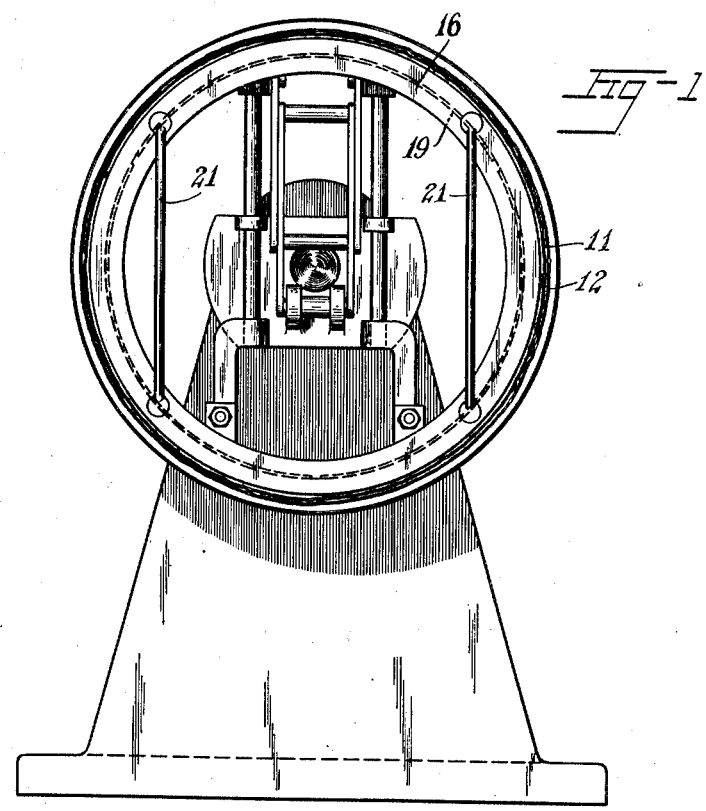
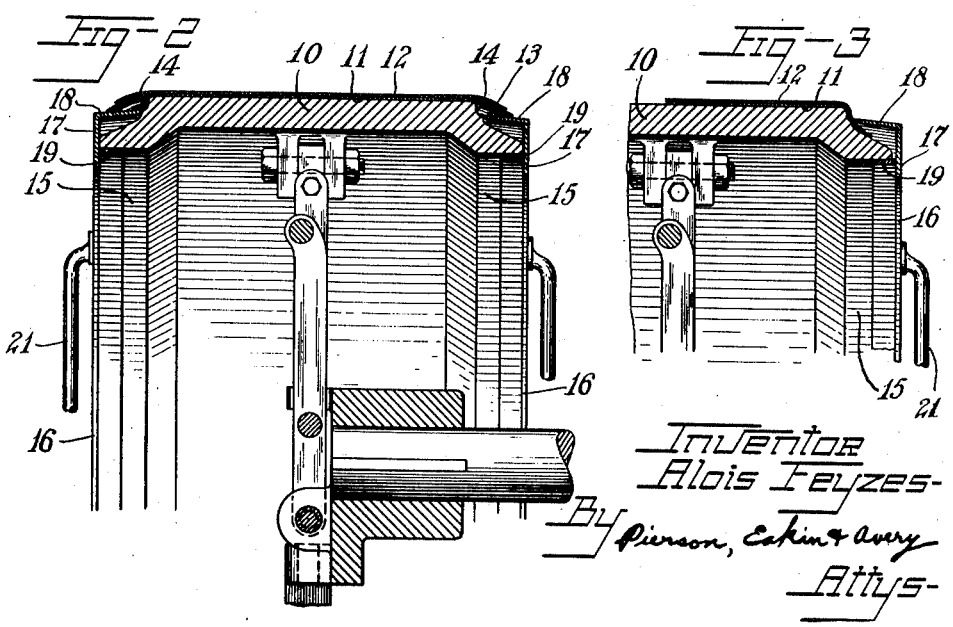

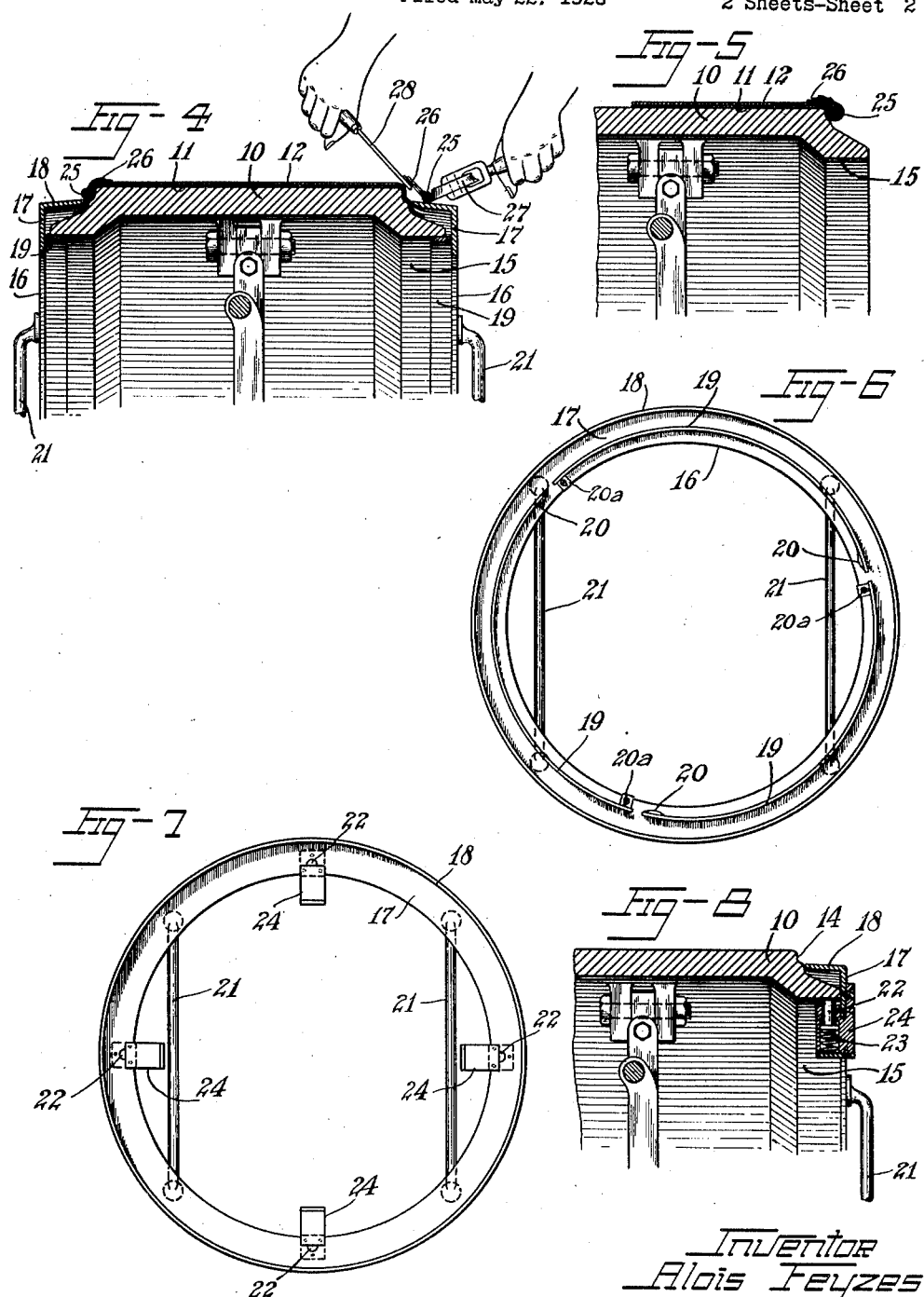

Patented Jan. 10, 1928.

1,655,897

UNITED STATES PATENT OFFICE.

ALOIS FEYZES, OF AKRON, OHIO, ASSIGNOR TO THE B. F. GOODRICH COMPANY, OF NEW YORK, N. Y., A CORPORATION OF NEW YORK.

APPARATUS FOR BUILDING TIRES.

Application filed May 22, 1926. Serial No. 110,965.

This invention relates to the art of building pneumatic tires and especially to the building of tires in the so-called flat band form wherein the tire band is formed by winding a strip or strips of tire-building material in a plurality of superimposed convolutions upon a building drum, and it is especially applicable to the building of straight-side tires having the usual inextensible beads, the bands for such tires usually being formed upon a drum having "drop-sides" or laterally facing shoulders against which the tire beads are constructed in substantially the same relation to the axis of the tire band that they are to occupy in the finished tire, so that they are not required to turn in the shaping of the band to tire form.

My chief objects are to provide for accurate and easy building of inextensible or other bead cores into the bead portions of a tire band.

Of the accompanying drawings:

Fig. 1 is an end elevation of a tire-building stand and a band-building drum thereon, the first two plies of tire-building material being shown in place upon the drum.

Fig. 2 is a fragmentary sectional view of the same and of a guide adapted to guide the bead core into place upon the under-the-bead plies of the tire band and to prevent undesirable contacts of the tire-building materials.

Fig. 3 is a similar sectional view at a later stage of operation.

Figs. 4 and 5 are similar sectional views at still later successive stages of operation.

Fig. 6 is a face view of the preferred type of guiding ring.

Fig. 7 is a similar face view of a modified type of ring.

Fig. 8 is a fragmentary sectional view of the band-building drum and a bead-guiding ring of the type shown in Fig. 7 in place thereon.

Referring to the drawings, the band-building drum 10, in the embodiment here shown, is formed with a substantially cylindrical face for the reception of the tire plies 11, 12, the said face being of such relative width that the bead portions of the said plies extend laterally beyond it, as shown at 13, Fig. 2, and the drum is formed at each side of the said face with a laterally-facing shoulder 14 against which the bead portion of the tire band may be built in a substantially radial position, so that the bead portions of the tire band will not require to be appreciably distorted from their original form in the subsequent shaping of the tire band to tire form.

The said drum is also formed with a cylindrical female surface 15 constituting the inner face of each of its lateral margins, each of the said surfaces being adapted to guide into and out of operative position a ring 16 adapted to serve as a shield, as shown in Fig. 2, to prevent the margins of the under-the-bead plies temporarily from coming in contact with the adjacent lateral faces of the drum, and also to serve as a visual guide for the feeding of the plies onto the building drum, the ring 16 being provided with guiding means adapted to coact with the cylindrical guide face 15 of the drum.

The ring preferably consists of an annular, radially-disposed sheet-metal portion 17 and an approximately cylindrical flange 18 extending from the outer margin of the said radial portion, and the guiding means upon the ring preferably consists, as shown in Fig. 6, of a plurality of arcuate springs 19, 19 each of which is secured at one end to the radial portion 17 of the ring as by welding or brazing at 20, and is adapted yieldingly to bear against the surface 15 of the drum to hold the ring in place. Each spring may be provided at its other end with an adjustable anchoring means 20ᵃ for varying the effective diameter of the spring assembly to compensate for wear. The ring is preferably provided with a plurality of handles 21, 21 to facilitate its mounting and removal with relation to the band-building drum.

In the type of ring illustrated in Figs. 7 and 8, the springs 19 of Figs. 1 to 6 are substituted by spring plungers 22, 22, each backed by a compression spring such as the spring 23 shown in Fig. 8, each plunger and its spring being mounted in a plunger casing 24 secured to the radial portion 17 of the ring.

In the operation of the apparatus a pair of the rings 16 are mounted upon the building drum 10 at the respective sides thereof and the under-the-bead plies of tire fabric 11, 12 are drawn onto the drum by rotation of the latter, the rings 16 serving to facilitate the positioning of the fabric plies upon the drum by reason of the fact that the rings hold the margins of the fabric outward to approximately cylindrical form so that the eye can readily gauge the accurate laying of the fabric by reference to the outer limit of the ring.

The under-bead plies are then stitched or spun down into place against the building drum, the ring 16 being removed either at the beginning of the stitching operation or after that operation has progressed as far as the ring permits while mounted upon the drum. After this stitching operation the ring is again mounted upon the drum with its approximately-cylindrical portion 18 overlying the margin of the fabric plies, as shown in Fig. 3, after which a bead-core ring 25, which may have the usual flipper strip 26 thereon, is spun into place against the under-bead plies by means of a hand roller 27, as shown in Fig. 4, a hand tool 28 preferably being employed as there shown, if the flipper strip 26 is present, to cause the flipper strip to feed into position upon the under-bead plies.

The ring 16 is then removed from the drum, the margins of the under-bead plies are worked up over the bead core and stitched into place as shown in Fig. 5, and the over-bead plies and other parts of the tire are then built onto the under-bead plies in the usual manner, either with or without the employment of the ring 16 to facilitate the guiding of over-bead plies onto the structure.

By the use of this simple apparatus the work of building the tire band is greatly simplified and facilitated and the above-stated objects are attained.

Modifications of details are possible within the scope of my invention and I do not wholly limit my claim to the specific construction or procedure described.

I claim:

In combination with a tire-building drum formed with an annular shoulder outwardly sloping toward the axis of the drum, an annular bead-guiding structure separate from the drum but positionable against the drum or against tire-building material thereon, the said structure being formed with a substantially cylindrical bead-supporting and guiding outer surface having a diameter intermediate the inner and outer diameters of the said annular shoulder.

In witness whereof I have hereunto set my hand this 15th day of May, 1926.

ALOIS FEYZES.